United States Patent

Gelfenbain

[11] Patent Number: 5,898,874
[45] Date of Patent: Apr. 27, 1999

[54] DYNAMIC CODESET TRANSLATION ENVIRONMENT

[75] Inventor: Alexander D. Gelfenbain, Mountain View, Calif.

[73] Assignee: Sun Microsystems, Inc., Palo Alto, Calif.

[21] Appl. No.: 08/710,709

[22] Filed: Sep. 20, 1996

[51] Int. Cl.$^6$ .................................................. G06F 19/00
[52] U.S. Cl. ............................................................ 395/705
[58] Field of Search ..................................... 395/705, 707

[56] References Cited

U.S. PATENT DOCUMENTS

| | | | |
|---|---|---|---|
| 5,307,492 | 4/1994 | Benson | 395/707 |
| 5,313,614 | 5/1994 | Goettelmann et al. | 395/705 |
| 5,551,015 | 8/1996 | Goettelmann et al. | 395/707 |
| 5,598,560 | 1/1997 | Benson | 395/707 |

Primary Examiner—Tariq R. Hafiz
Assistant Examiner—John Q Chavis
Attorney, Agent, or Firm—Graham & James LLP

[57] ABSTRACT

A method and apparatus for providing a translation environment for a computer system. Structurally, the present invention includes three main components: a codeset manager, a codeset database, and a codeset translation engine. The codeset manager compiles a set of codeset definitions. The compiled codeset definitions, or translation methods, are included in a codeset database. To translate a character, a client process requests the translation, specifying a source codeset and a target codeset from the codeset translation engine. The codeset translation engine transmits the requested translation to the codeset manager which searches the codeset database for an appropriate translation method. If no appropriate translation method exists in the codeset database, the codeset manager may be able to create a translation method using one or more translation methods in the codeset database. If an appropriate translation method is found or created, the translation method is executed to perform the requested translation. The translated character or characters are then returned to the client process.

24 Claims, 6 Drawing Sheets

DYNAMIC CODESET TRANSLATION ENVIRONMENT

RELATED APPLICATIONS

U.S. application Ser. No. 08/718,201, entitled "S-table Approach to Data Translation" of Alexander Gelfenbain, the disclosure of which is incorporated in this application by reference.

FIELD OF THE INVENTION

The present invention pertains generally to the translation of data within computer systems. More specifically, the present invention is a method and apparatus for providing a reconfigurable environment for the translation of characters between a plurality of source codesets and a plurality of target codesets.

BACKGROUND OF THE INVENTION

Translation of single and multi-byte characters is a common and well know procedure within computer systems of many types. For example, computer systems routinely translate between characters of the ASCII codeset and characters of the EBCDIC codeset. In general, a number of differing methods exist for the translation of characters between differing codesets. Practice has established that each of these methods may be more, or less, optimal for a particular translation. Thus, for small codesets, such as the ASCII codeset, translation may be accomplished using simple translation tables. These translation tables map characters in the source codeset to equivalent characters in the target codeset and result in a translation method which is both relatively fast and relatively simple. Unfortunately, application of this fast and simple methodology to large codesets, such as the Kanji codeset, results in translation tables which may be intractably large. As a result, when large codesets are involved, it is often necessary to use an alternate translation method which is both more complex and more time consuming than simple translation tables.

Based on the foregoing, it is easy to appreciate that there is a necessity for a variety of translation methods. Unfortunately, the differing needs of different translations has encouraged the implementation of translation systems in a piecemeal and haphazard fashion. As a result, it is generally the case that multiple distinct translation systems exists within a single computer system where each translation system will be directed at translation between a small number of differing codesets.

The existence of multiple translation system within a single computer system has several disadvantages. For example, replication of the same translation method results in wasted systems resources, such as computer memory and disk space. In addition, replication of the same translation method is generally expensive wastes programmer time as the method is reimplemented one or more times. Additionally, implementation of multiple translation systems may result in an incomplete translation capability. As an example, assume that a first process includes a translation from an idealized codeset A to an idealized codeset B. Assume as well that a second process includes a translation from the idealized codeset B to an idealized codeset C. Under these circumstances, if a process requires a translation from codeset A to codeset C, a new translation method will have to be constructed. This, in spite of the fact that a method already exist in the system which might be used to perform the desired translation.

A separate disadvantage associated with traditional methodologies for translation is the difficulty associated with the addition of new translations to the system or modification of existing translations. More specifically, when multiple translation systems exist within multiple parts of a computer system, there may be no easy way to add a new translation that is generally available within the computer system. Instead, addition of a new translation often requires that the translation be added separately to multiple parts of the computer system. Such an approach makes it difficult to maintain the computer system.

SUMMARY OF THE INVENTION

The present invention is a method and apparatus for providing a translation environment for a computer system. Structurally, the present invention includes three main components: a codeset manager, a codeset database, and a codeset translation engine.

The first of these components, the codeset manager, is a compiler which accepts, as input, a codeset definition file. The codeset definition file is an ASCII file, or otherwise human readable file, which contains a series of codeset definitions. Preferably, the codeset definition file is written using a codeset definition language. Each codeset definition is a series of attributes which name a source codeset and then provide a mapping between each character in the source codeset and a character in a target codeset. The codeset manager reads each of these codeset definitions and produces a translation method for each codeset definition. The translation method is a computer executable routine which translates characters in the source codeset to the equivalent characters in the target codeset.

As each new translation method is created by the codeset manager, it is entered in a codeset database. In this way, the codeset database becomes a centralized repository which contains all of the translation methods. For the present invention, the codeset database is implemented in a fashion which allows the database to be searched for translation methods which have a desired source codeset or a desired target codeset.

The third major component of the present invention is the codeset translation engine. In general terms, the codeset translation engine may be described as an interface between software processes, such as application programs, and the codeset manager and codeset database. More specifically, the codeset translation engine is implemented as a set of application programming interfaces, or APIs. Each API is a routine which a software process may use to access the translation methods in the codeset database. Specifically, by using the correct API, a software process may request that a character, or a block of characters, be translated from a desired source language to a desired target language. The codeset translation engine communicates this request to the codeset manager which causes the codeset manager to search the codeset database for an appropriate translation method. When the appropriate translation method is located, the codeset manager executes the translation method, passing the character or block of characters for which the translation was requested. At the conclusion of the translation process the translated character, or character block, is returned to the software process which had requested the translation.

In some cases, a software process may use the codeset translation engine to request a translation which cannot be located in the codeset database. If this happens, the codeset manager may examine the codeset database to locate one or more translation methods which may be combined to create the required translation. For example, assume that a translation method from codeset A to codeset C cannot be found in the codeset database. Assume in addition that translation methods from codeset A to an intermediate codeset B and from the intermediate codeset B to codeset C are available. In this case, the desired translation may be created by applying the two separate translation methods in series. Using a more complex procedure, a translation may also be created for two translation methods which share the same target codeset. For example, assume that a translation method exists for translation from codeset A to an intermediate codeset B. Assume also that a translation method exists in the codeset database for translation from codeset C to the intermediate codeset B. In this case, a translation method may be constructed which maps codeset A to codeset C. This is done, not by applying the two translation methods in series, but by finding, for each character in the codeset A, the character in the codeset C which has the same translation in the intermediate codeset B.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

The present invention is a method and apparatus for providing a translation environment for a computer system. More specifically, for the present invention, a codeset is defined as a sequence of one or more characters. Character are assumed to have a human readable form, such as 'A' or 'B', as well as a numeric ordinal value. Codesets may have fixed size characters, meaning that each character occupies a specific number of bytes. Codesets may also have variable size characters, meaning that each character may occupy a variable number of bytes. Translations may be defined for codesets, meaning that a mapping may be constructed which selects an equivalent character in a target codeset for any given character in source codeset. Some codesets are described as universal codesets meaning that the codeset is specifically intended to provide a common codeset which may be translated to and from a large number of non-universal codesets. The present invention provides an environment for selective translation of characters between a plurality of source codesets and a plurality of target codesets.

Figure 1:
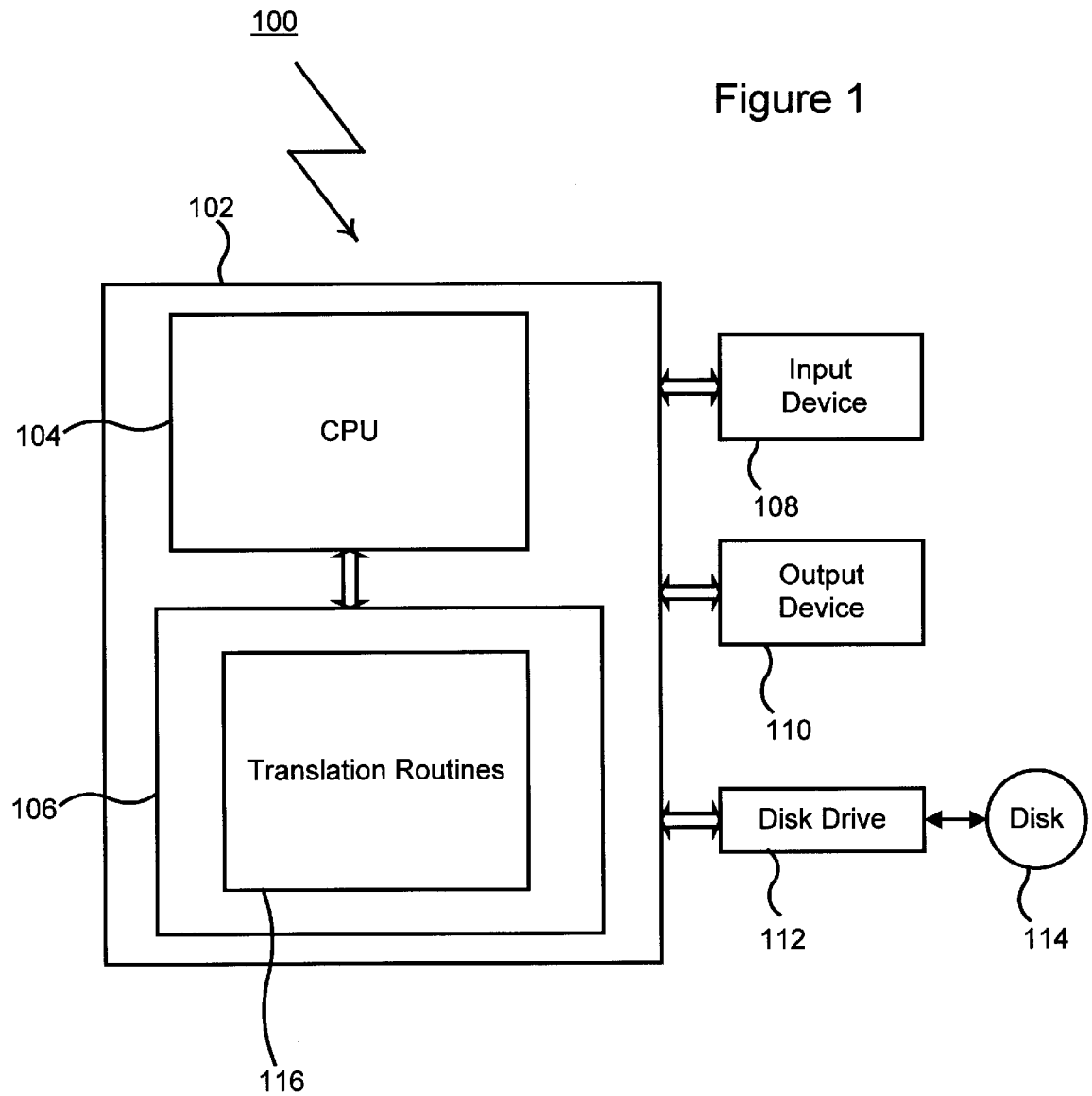
FIG. 1 is a block diagram of a computer system in accordance with a preferred embodiment of the present invention.

In FIG. 1, a data processing system 100 is shown as a representative environment for the present invention. Structurally, the data processing system 100 includes a host computer 102 which, in turn, includes a central processing unit, or CPU 104, and memory 106. An input device 108 and an output device 110 are connected to the host computer 102 and represent a wide range of varying I/O devices such as keyboards, modems, network adapters, printers and displays. A disk drive 112 is shown connected to the host computer 102. The disk drive 112 read, for example, a floppy disk 114.

Figure 2:
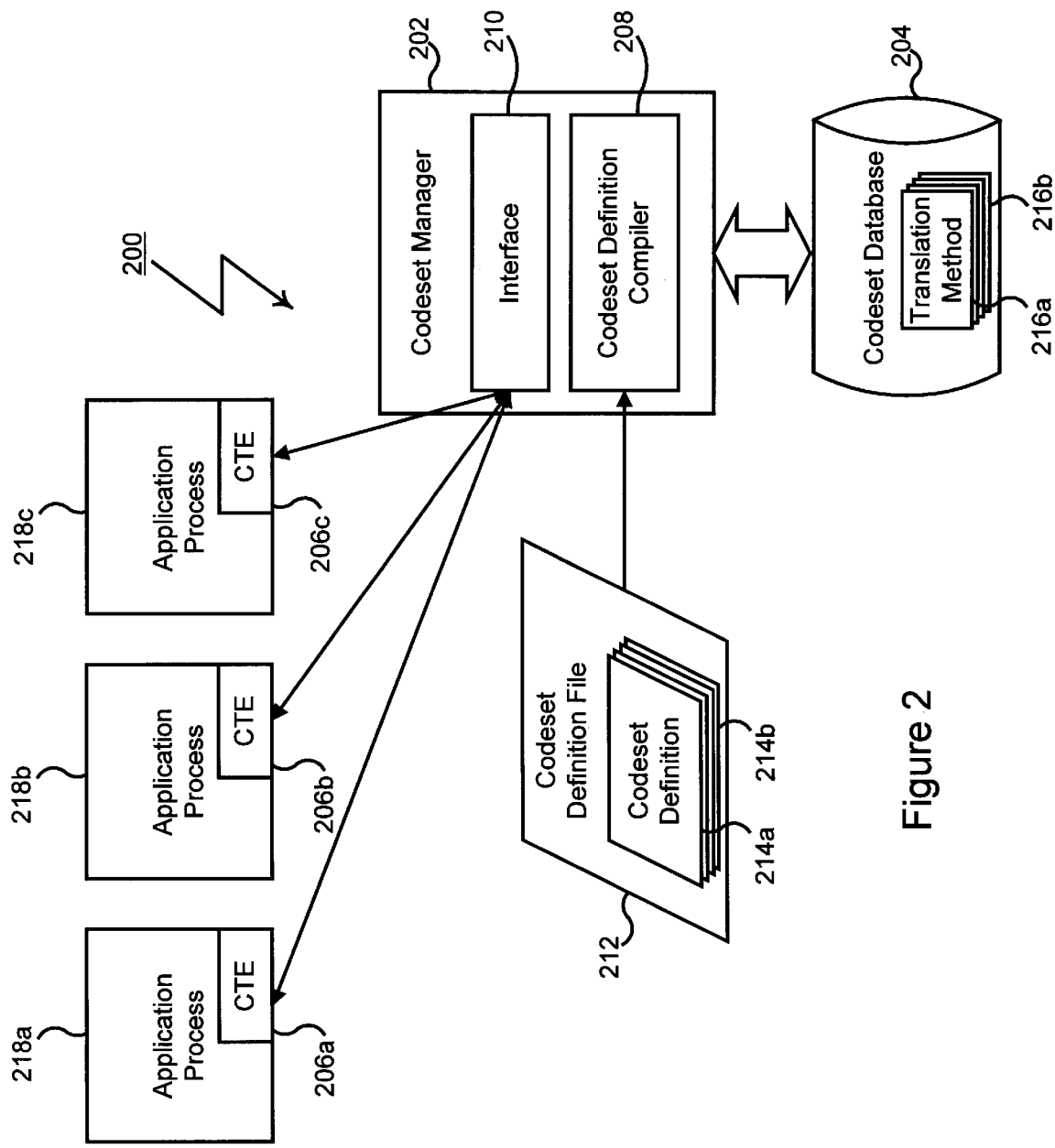
FIG. 2 is a block diagram of the apparatus of the present invention.

In FIG. 2, the apparatus of the present invention is shown and generally designated 200. Structurally, and as shown in FIG. 2, the present invention includes three major components: a codeset manager 202, a codeset database 204 and a codeset translation engine, shown as three representative instances 206a through 206c. Each of these components is implemented as a set of computer instructions stored in memory 106 and executed by CPU 104. These components are represented by the translation routines 116 of computer system 100.

The first major component of the apparatus 200, the codeset manager 202, is shown in FIG. 2 to include a codeset definition compiler 208 and an interface 210. The codeset definition compiler 208 has an associated input file, known as a codeset definition file 212, which is an ASCII, or otherwise human readable and modifiable file. The codeset definition file 212 is written in a codeset definition language and contains a series of codeset definitions, of which codeset definitions 214a and 214b are representative.

Each codeset definition 214 is used to define a source codeset and contains the following attributes:
  name—the codeset name is an ASCII string which provides a unique name for the source codeset,
  character size—if the source codeset will use fixed size characters, the codeset character size is the number of bytes occupied by each character, if the source codeset will use a variable character size, the codeset character size is a negative number, whose absolute value is the number of bytes occupied by the largest character in the source codeset,
  default character—when translating to the target codeset, the default character is used for all characters in the source codeset which have no translation in the target codeset,
  target codeset—the target codeset is the name of a codeset that will be used to define the source codeset, a universal codeset may be used as the target codeset,
  character set—the character set attribute specifies an algorithm which is used to construct the source codeset from the characters of the target codeset. The simplest form of this attribute is a list of characters. Other symbolic representations of construction algorithms can also be used. For example, the character set may specify the S-table translation method described in a co-pending, commonly owned application, U.S. application Ser. No. 08/718,201, entitled "S-table Approach to Data Translation" of Alexander Gelfenbain, the disclosure of which is incorporated in this application by reference.

Figure 3:
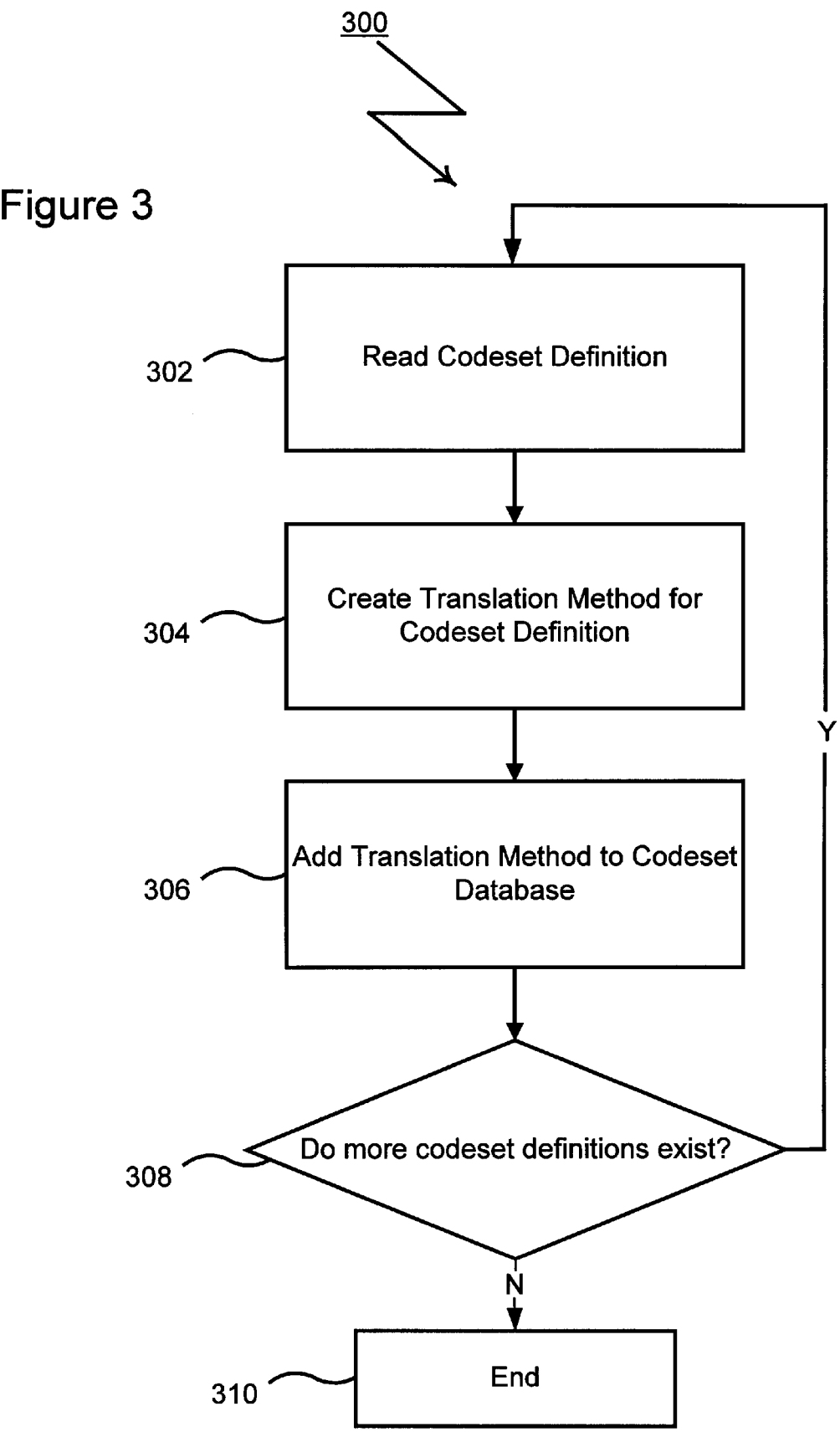
FIG. 3 is a flowchart of the steps associated with the compilation of the codeset definition file of the present invention.

The method used by the codeset definition compiler 208 is shown in FIG. 3 and generally designated 300. More specifically, method 300 begins with step 302 where a codeset definition 214 is read from the codeset definition file 212. Reading of the codeset definition 214 generally involves reading each of the attributes mentioned in the preceding section and may be performed by any of several methods well known in the pertinent art.

Once the codeset definition 214 has been has been read from the codeset definition file 212, a translation method 216 is constructed for the source codeset defined by the codeset definition 214. The translation method 216 is implemented as a sequence of instructions, executed by CPU 104, which translate characters in the source codeset of the codeset definition 214, to characters in the target codeset of the codeset definition 214. For characters in the source codeset which have no translation in the target codeset, the translation method 216 returns the default character of the codeset definition 214.

In general, many differing methods exist for translation of characters between source and target codesets. For the purposes of the present invention, a translation method 216 may be constructed which uses any of these methods. For example, for simple codesets, an array may be constructed which contains, for each character in the source codeset of the codeset definition 214, an equivalent character in the target codeset of the codeset definition 214. Once the array has been completed, a function is created which accepts a character in the source codeset as an argument and returns the equivalent target codeset character from the array.

In step 308, the translation method 216 created in step 304 is stored in the codeset database 204. The codeset database is the second major component of the apparatus 200 and may be implemented using a number of well known database methodologies. Importantly, translation method 216 is stored in codeset database 204 in a fashion which associates the name and target codeset of the codeset definition 214 with the translation method 216. In this way, the codeset database 204 may be searched for a translation method 216 having a particular source codeset or a particular target codeset.

In step 306, a test is made to see if additional codeset definitions 214 remain in the codeset definition file 212. In the positive case, the loop of steps 302 through 308 is repeated to define additional translation methods 216. Alternatively, if no more codeset definitions 214 remain in the codeset definition file 212, method 300 terminates at step 310. The overall effect of the method 300 is to create a series of translation methods 216, each contained in the codeset database 204.

The third major component of the apparatus 200 is the codeset translation engine 206. As shown in FIG. 2, the codeset translation engine 206 is linked to three application programs, designated 218a through 218c, respectively. In general terms, the codeset translation engine 206 is a predefined set of application programming interfaces, or APIs. APIs are functions, or procedures which may be called by a client software process to access the translation methods 216 stored in the codeset database 204. More particularly, the codeset translation engine 206 includes procedures for translating single characters and blocks of characters.

Figure 4:
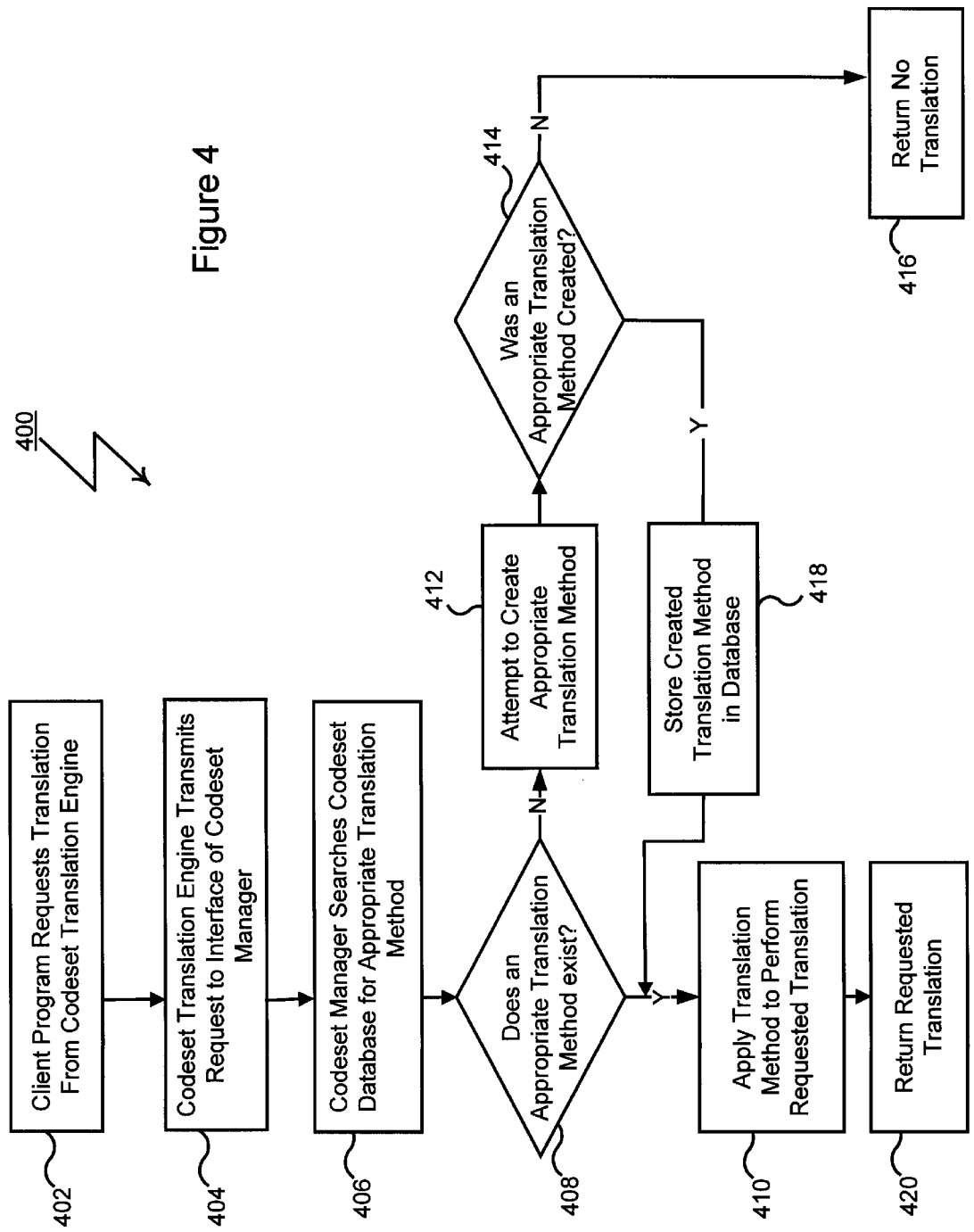
FIG. 4 is a flowchart of the steps associated with the translation of a character using the method and apparatus of the present invention.

The method used by the codeset translation engine 206 is shown in FIG. 4 and generally designated 400. More specifically, method 400 begins with step 402 where a client program, such as application program 218a, requests the translation of an input character from the codeset translation engine 206. This request takes the form of a procedure call executed by the client program. As part of the procedure call, the client program passes, as parameters, the input character to be translated, an indication of the desired source codeset and, an indication of the desired target codeset.

In step 404, the codeset translation engine 206 transmits the client's translation request to the interface 210 of the codeset manager 202. In general, transmission of this type may be performed by a range of differing interprocess communication methods. In other cases, it may be desirable to implement the codeset manager 202 as a set of library routines which execute in the context of the client process. In these cases, the transmission of the client's request is performed as part of the procedure call of step 402 and no interprocess communication is required. Regardless of the communication technique employed, the result of step 404 is that the interface 210 of the codeset manager 202 is placed into possession of the client's translation request.

In step 406, the interface 210 of the codeset manager 202 searches the codeset database 204 for a translation method 216 which matches the client's requested translation. Specifically, the codeset database 204 is searched for a translation method 216 which has a source codeset which matches the source codeset of the client's request and a target codeset which matches the target codeset of the client's request.

Figure 5:
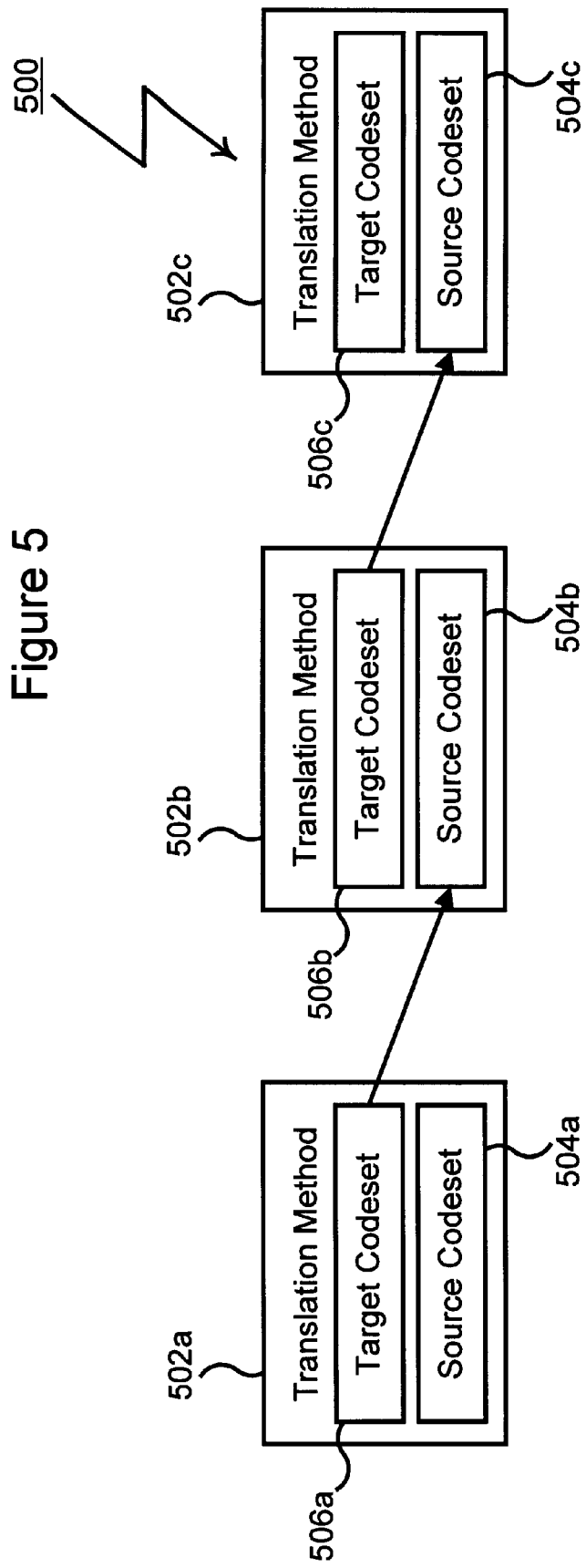
FIG. 5 is a block diagram of a series of translation methods as used during the creation of a translation method.

In step 408, the result of the search of the codeset database 204 is tested. If an appropriate translation method 216 has been located, execution continues at step 410. In the alternative, i.e., in cases where no appropriate translation method 216 has been located, execution continues at step 412. Assuming the later case first, an attempt is made, in step 412 to create an appropriate translation method 216. The present invention creates new translation methods 216 using two different, but related techniques. For the first of these techniques, the codeset database 204 is searched for a series of translation method 502 of the form shown in FIG. 5. More specifically, FIG. 5 shows a series of translation methods 216 which are generally designated 500. Series 500 includes a first translation method 502a, a second translation method 502b and a third translation method 502c. Each translation method 502 has a source codeset 504a, 504b and 504c respectively. Each translation method 502 also has a target codeset 506a, 506b and 506c, respectively. Importantly, the target codeset 506a of the first translation method 502a is equivalent to the source codeset 504b of the second translation method 502b. Similarly, the target codeset 506b of the second translation method 502b is equivalent to the source codeset 504c of the third translation method 502c. In other words, it may be seen that the translation method 502 may be applied, in series, to translate characters from the source codeset 504a of the first translation method 502a to the target codeset 506c of the third translation method 502c. Using this technique, the present invention may create translation methods 216, which are not defined by a particular codeset definition 214, by using one or more intermediate codesets. In the context of step 412 of FIG. 4, this technique may be applied to potentially generate an appropriate translation method 216 which matches the client's requested translation.

Figure 6:
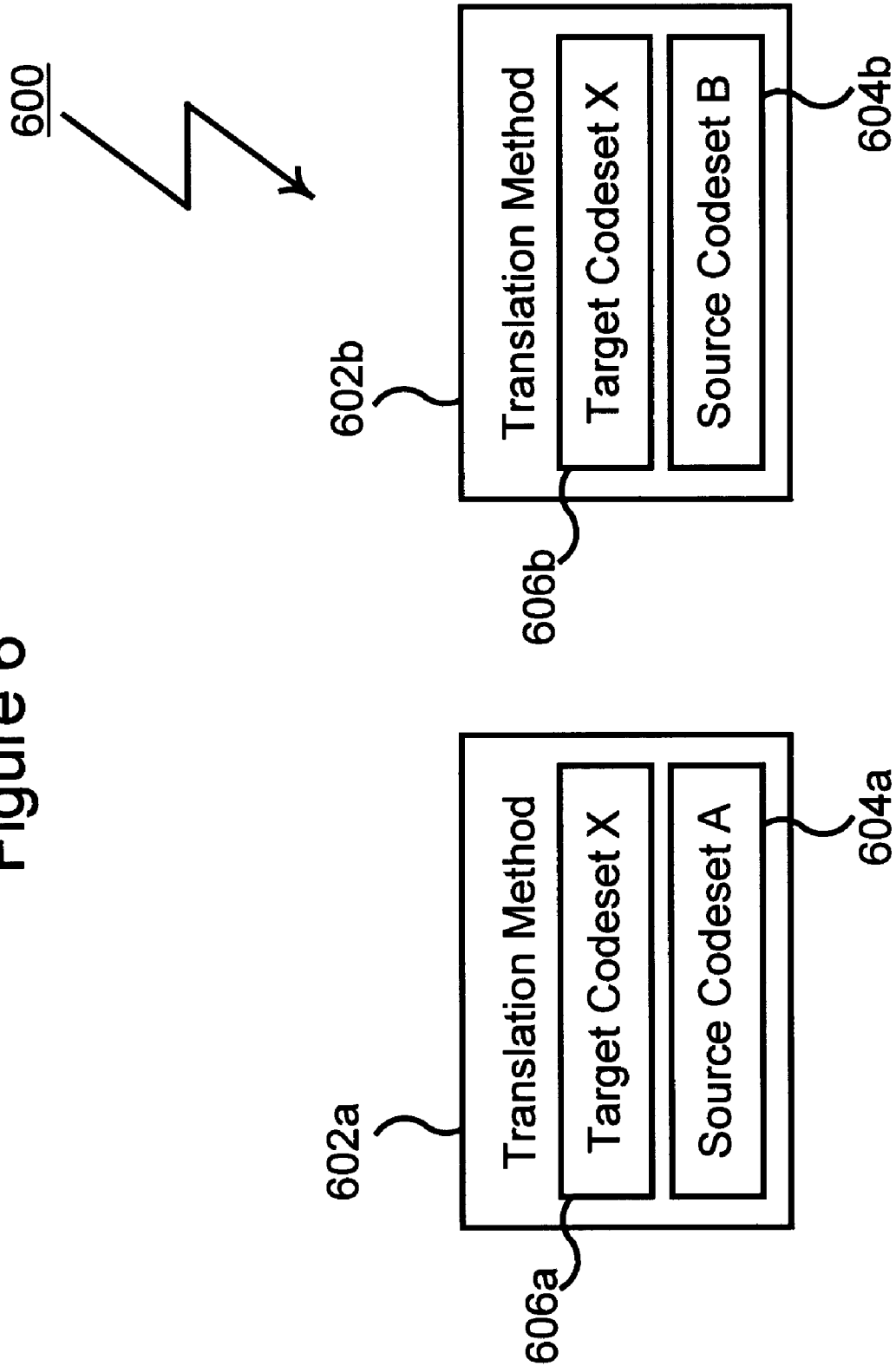
FIG. 6 is a block diagram of a pair of translation methods as used during the creation of a translation method.

For the second method for creating an appropriate translation method 216, the codeset database 204 is searched for a pair of translation methods 216 of the form shown in FIG. 6. More specifically, FIG. 6 shows a pair of translation methods 216 which are generally designated 600. Pair 600 includes a first translation method 602a, and a second translation method 602b. Each translation method 602 has a source codeset 604a and 604b respectively. Each translation method 602 also has a target codeset 606a and 606b respectively. Importantly, the target codeset 606a of the first translation method 602a is equivalent to the target codeset 606b of the second translation method 602b. Creation of a new translation method 216 proceeds by locating each character in source codeset 604a and each character in source codeset 604b which share common translations in target codeset 606a or 606b. Using this second technique, the present invention may create translation methods 216, which are not defined by a particular codeset definition 214, by using an intermediate codeset. In the context of step 412 of FIG. 4, this second technique may be applied to potentially generate an appropriate translation method 216 which matches the client's requested translation. The techniques described by the preceding paragraphs for creating translation methods 216 are particularly useful if a large number of translation methods 216 are defined using a universal character set as the target codeset.

In step 414, a test is made to determine if an appropriate translation method 216 was generated in the preceding step 412. If no appropriate translation method 216 was generated, execution continues at step 416 where the interface 210 of the codeset manager 202 returns an indication of no translation to the codeset translation engine 206. This indicates that no appropriate translation method 216 existed in the codeset database 204 and the present invention was unable to create an appropriate translation method 216 using either of the two techniques previously described.

In the alternative, i.e., if step 414 indicates that an appropriate translation method 216 was created in step 412, execution continues at step 418. Step 418 stores the created translation method 216 in the codeset database 204. This step allows the created translation method 216 to be accessed during subsequent translation requests.

Step 410 is reached if an appropriate translation method 216 existed in the codeset database 204 or if an appropriate translation method 216 was created using either of the two techniques previously described. In step 410, the interface 210 of the codeset manager 202 executes the translation method 216 to translate the character or characters included in the client's translation request. The translated character or characters is then returned in step 420.

The present invention specifically incorporates an article of manufacture, which is a computer readable medium such as a floppy disk, optical disk, or hard drive, etc., storing computer instructions for providing a translation environment described in the preceding paragraphs with reference to FIGS. 1 through 6.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for maintaining a system for translation between a plurality of codesets, the method comprising the steps, performed by a computer system, of:

providing a plurality of codeset definitions, each codeset definition specifying a source codeset, a target codeset, and a mapping between the source codeset and the target codeset;

compiling the codeset definitions to produce corresponding translation methods, each translation method being executable to translate characters between the source codeset and target codeset specified by a codeset definition; and storing the translation methods in a codeset database.

2. A method as recited in claim 1 further comprising the steps of:

receiving a translation request specifying a desired source codeset, a desired target codeset and an input character to be translated;

locating a matching translation method in the codeset database which is executable to translate characters between the desired source codeset and the desired target codeset;

executing the matching translation method to translate the input character from the desired source codeset to the desired target codeset; and returning the translated input character.

3. A method as recited in claim 1 further comprising the steps of:

receiving a translation request specifying a desired source codeset, a desired target codeset and an input character to be translated;

combining two or more translation methods from the codeset database to create a new translation method, the new translation method being executable to translate characters between the desired source codeset and the desired target codeset;

executing the new translation method to translate the input character from the desired source codeset to the desired target codeset; and returning the translated input character.

4. A method as recited in claim 3 further comprising the step of storing the new translation method in the codeset database.

5. A method as recited in claim 3 where the step of combining two or more translation methods from the codeset database to create a new translation method further comprises the steps of:

locating a first translation method in the codeset database, the first translation method being executable to translate characters between a source codeset and an intermediate codeset;

locating a second translation method in the codeset database, the second translation method being executable to translate characters between the intermediate codeset and a target codeset; and creating the new translation method, the new translation method being executable to translate characters between the source codeset of the first translation method and the target codeset of the second translation method.

6. A method as recited in claim 3 where the step of combining two or more translation methods from the codeset database to create a new translation method further comprises the steps of:

locating a first translation method in the codeset database, the first translation method being executable to translate characters between a source codeset and an intermediate codeset;

locating a second translation method in the codeset database, the second translation method being executable to translate characters between a source codeset and an intermediate codeset; and creating the new translation method, the new translation method being executable to translate characters between the source codeset of the first translation method and the source codeset of the second translation method.

7. A method as recited in claim 1 wherein one of the source codeset and the target codeset of each codeset definition is a universal character set.

8. A method as recited in claim 1 wherein the plurality of codeset definitions are specified using a codeset definition language.

9. A method for translating a character from a source codeset to a target codeset, the method comprising the steps, performed by a computer system, of:
 sending a request from a client process to a server process for a translation of the character between the source codeset and the target codeset;
 receiving the request in the server process;
 locating, in the server process, a matching translation method within a codeset database, the matching translation method being executable to translate characters between the source codeset and the target codeset;
 executing, in the server process, the matching translation method to translate the input character from the desired source codeset to the desired target codeset; and
 returning the translated character from the server process to the client process.

10. A method as recited in claim 9 wherein the locating step further includes the steps, performed by the computer system, of:
 locating a first translation method within a codeset database, the matching translation method being executable to translate characters between the source codeset and an intermediate codeset;
 locating a second translation method within a codeset database, the matching translation method being executable to translate characters between the intermediate codeset and the target codeset; and
 creating a new translation method, the translation method being executable to translate characters between the source codeset and the target codeset.

11. A method as recited in claim 10 further comprising the step of storing the new translation method in the codeset database.

12. A method as recited in claim 10 wherein the intermediate codeset is a universal codeset set.

13. A method as recited in claim 9 wherein the locating step further includes the steps, performed by the computer system, of:
 locating a first translation method within a codeset database, the matching translation method being executable to translate characters between the source codeset and an intermediate codeset;
 locating a second translation method within a codeset database, the matching translation method being executable to translate characters between the target codeset and the intermediate codeset; and
 creating a new translation method, the translation method being executable to translate characters between the source codeset and the target codeset.

14. A method as recited in claim 13 further comprising the step of storing the new translation method in the codeset database.

15. A method as recited in claim 13 wherein the intermediate codeset is a universal codeset.

16. A computer program product comprising:
 a computer usable medium having computer readable code embodied therein for maintaining a system for translation between a plurality of codesets, the computer program product comprising:
 computer readable program code devices configured to cause a computer to compile codeset definitions to produce translation methods, each codeset definition specifying a source codeset, a target codeset, and a mapping between the source codeset and the target codeset;
 computer readable program code devices configured to cause a computer to store each translation method in a codeset database;
 computer readable program code devices configured to cause a computer to receive translation requests from client processes, each translation request specifying a desired source codeset, a desired target codeset and an input character to be translated;
 computer readable program code devices configured to cause a computer to locate a matching translation method in the codeset database which is executable to translate characters between the desired source codeset and the desired target codeset; and
 computer readable program code devices configured to cause a computer to execute the matching translation method to translate the input character from the desired source codeset to the desired target codeset, and to cause the computer to return the translated input character to the requesting client process.

17. A product as recited in claim 16 which further comprises computer readable program code devices configured to cause a computer to combine two or more translation methods from the codeset database to create new translation methods, each new translation method being executable to translate characters between a source codeset and a target codeset which have no matching translation method in the codeset database.

18. A product as recited in claim 17 which further comprises computer readable program code devices configured to cause a computer to store each new translation method in the codeset database.

19. A product as recited as recited in claim 17 wherein the computer readable program code devices configured to combine two or more translation methods further includes:
 computer readable program code devices configured to cause a computer to locate a first translation method in the codeset database, the first translation method being executable to translate characters between a source codeset and a target codeset;
 computer readable program code devices configured to cause a computer to locate a second translation method in the codeset database, the second translation method being executable to translate characters between a source codeset and a target codeset; and
 computer readable program code devices configured to cause a computer to create the new translation method, the new translation method being executable to translate characters between the source codeset of the first translation method and the target codeset of the second translation method.

20. A product as recited in claim 17 wherein the computer readable program code devices configured to combine two or more translation methods further includes:
 computer readable program code devices configured to cause a computer to locate a first translation method in the codeset database, the first translation method being executable to translate characters between a source codeset and a target codeset;
 computer readable program code devices configured to cause a computer to locate a second translation method in the codeset database, the second translation method being executable to translate characters between a source codeset and a target codeset; and computer readable program code devices configured to cause a computer to create the new translation method, the new translation method being executable to translate characters between the source codeset of the first translation method and the source codeset of the second translation method.

21. A method in a computer system having a codeset database, the codeset database including one or more translation methods, each translation method being executable to translate a character from a source codeset to a target codeset, the method comprising the steps, performed by the computer system, of:

receiving a translation request specifying a desired source codeset, a desired target codeset and an input character to be translated;

locating a matching translation method in the codeset database which is executable to translate characters between the desired source codeset and the desired target codeset;

executing the matching translation method to translate the input character from the desired source codeset to the desired target codeset; and returning the translated input character.

22. An apparatus for maintaining a system for translation between a plurality of codesets, the apparatus comprising:

a codeset manager configured to compile codeset definitions to produce translation methods, each codeset definition specifying a source codeset, a target codeset, and a mapping between the source codeset and the target codeset; and a codeset database configured to store each translation method produced by the codeset manager.

23. An apparatus as recited in claim 22 further comprising a codeset translation engine configured to receive a translation request specifying a desired source codeset, a desired target codeset and an input character to be translated, the codeset translation engine using the translation request to locate a matching translation method in the codeset database which is executable to translate characters between the desired source codeset and the desired target codeset, the codeset translation engine then executing the matching translation method to translate the input character from the desired source codeset to the desired target codeset.

24. An apparatus as recited in claim 23 wherein the codeset translation engine is a server process.

* * * * *